July 6, 1926.
J. F. CARLSON
1,591,467
ROTARY TWO-CYCLE INTERNAL COMBUSTION ENGINE
Filed Jan. 23, 1924      6 Sheets-Sheet 1
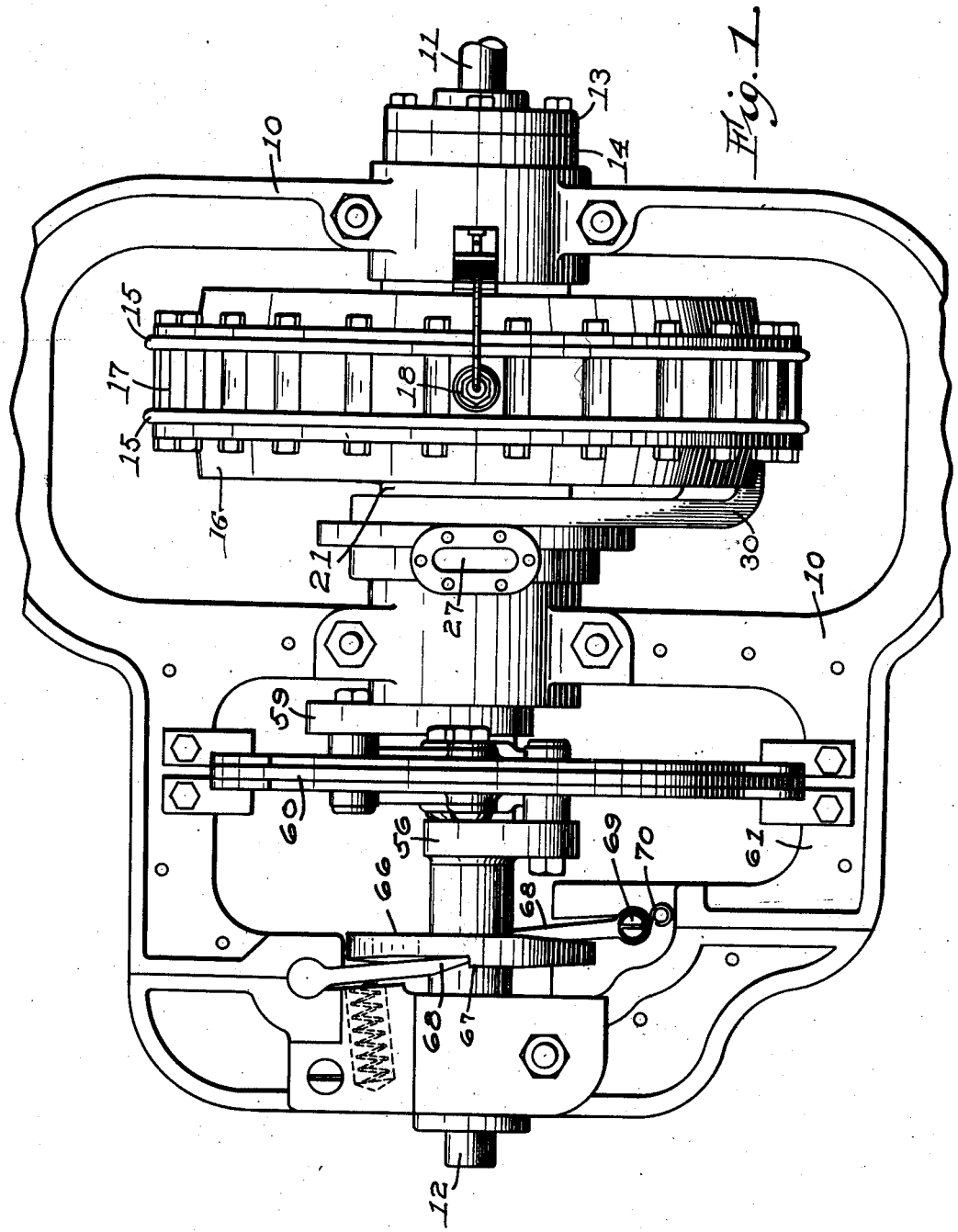

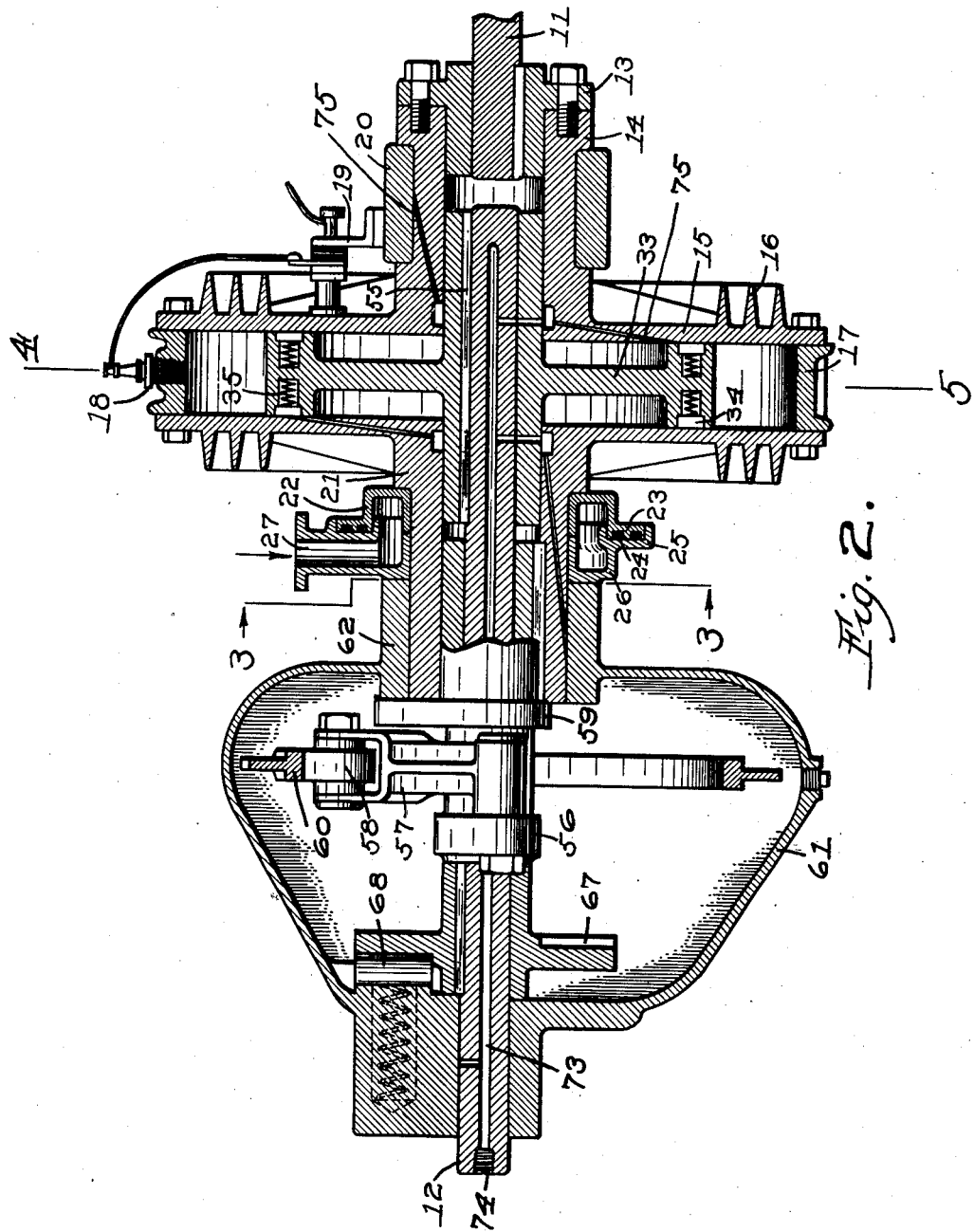

July 6, 1926.
J. F. CARLSON
1,591,467
ROTARY TWO-CYCLE INTERNAL COMBUSTION ENGINE
Filed Jan. 23, 1924    6 Sheets-Sheet 3
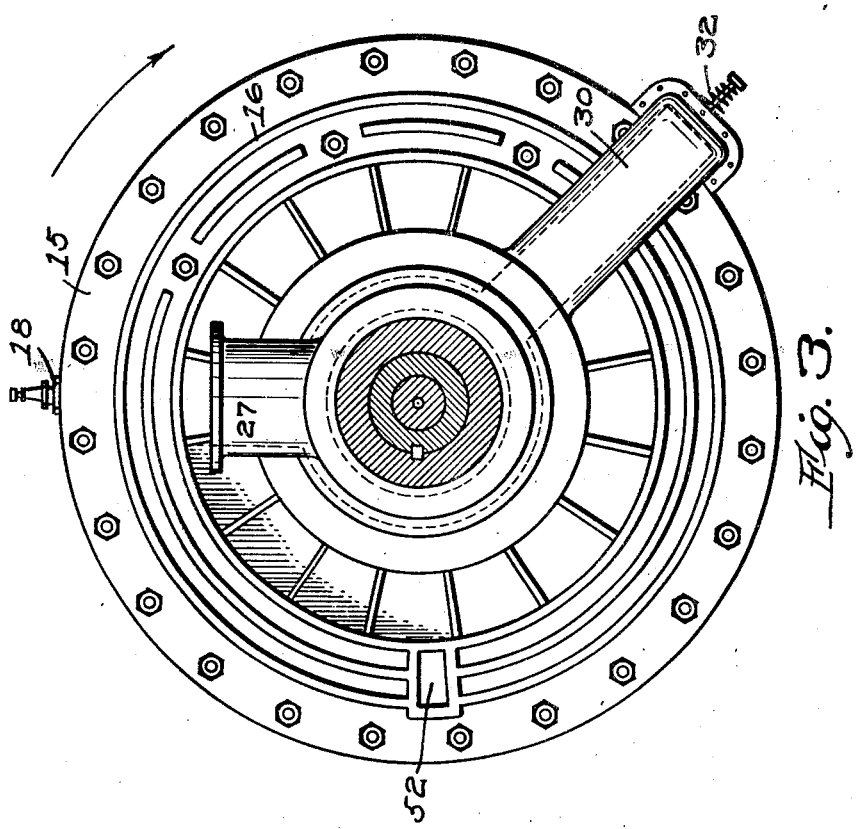
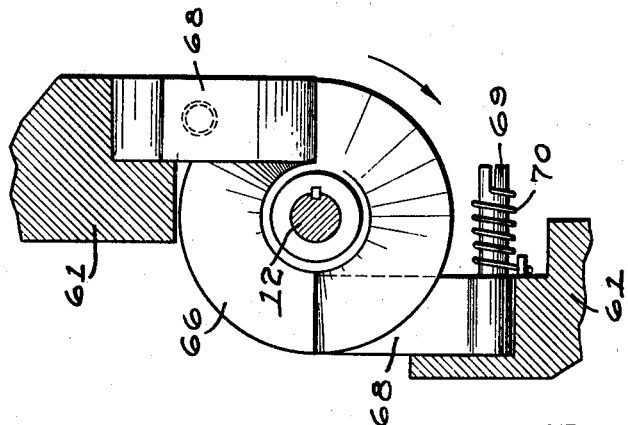
Inventor
John F. Carlson
By Attorneys
Southgate & Southgate July 6, 1926.

J. F. CARLSON 1,591,467

ROTARY TWO-CYCLE INTERNAL COMBUSTION ENGINE

Filed Jan. 23, 1924    6 Sheets-Sheet 4

Inventor
John F. Carlson
By Attorneys
Southgate & Southgate

July 6, 1926.  
J. F. CARLSON  
1,591,467  
ROTARY TWO-CYCLE INTERNAL COMBUSTION ENGINE  
Filed Jan. 23, 1924  6 Sheets-Sheet 5
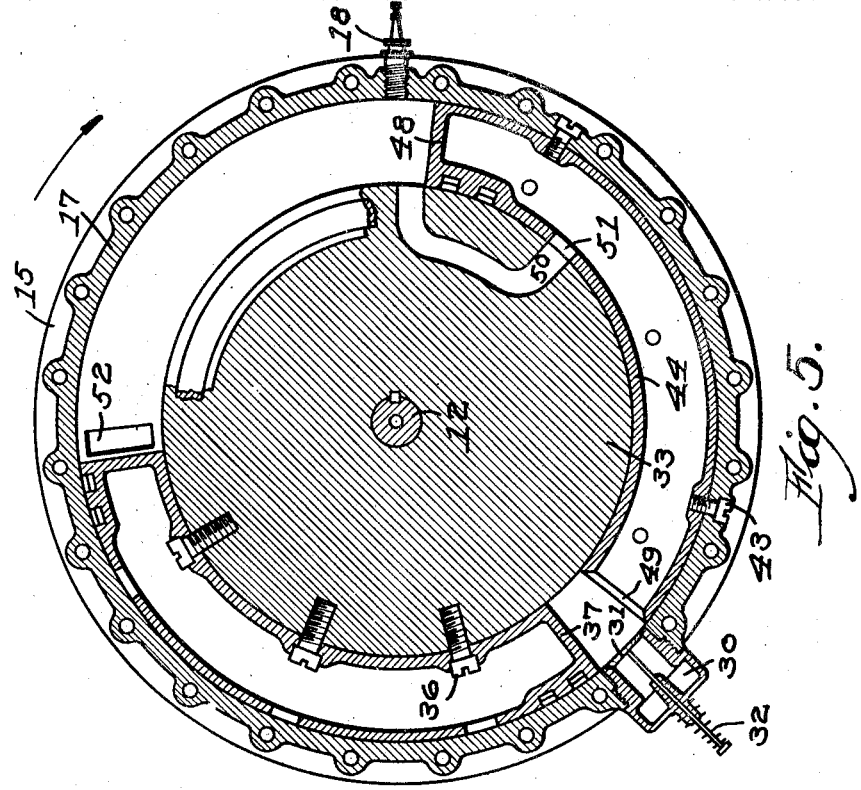
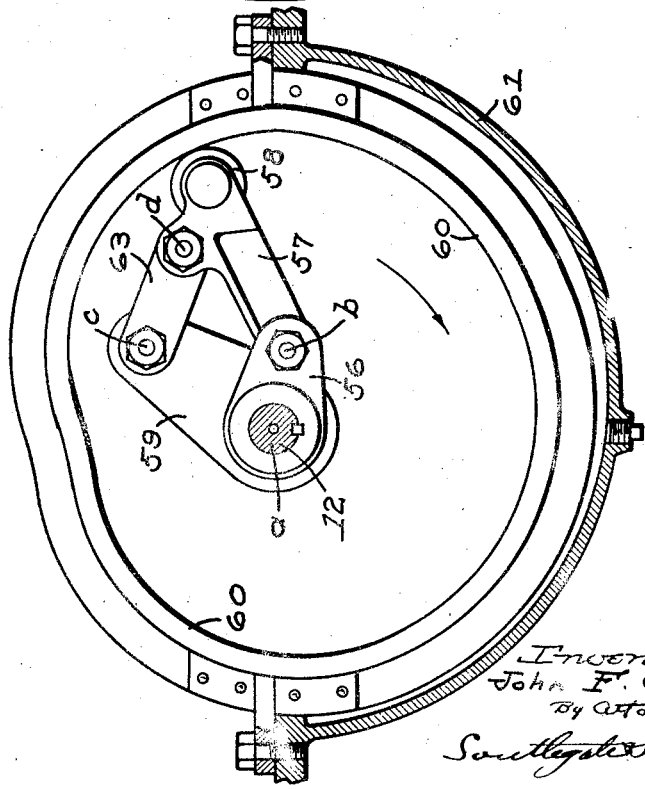

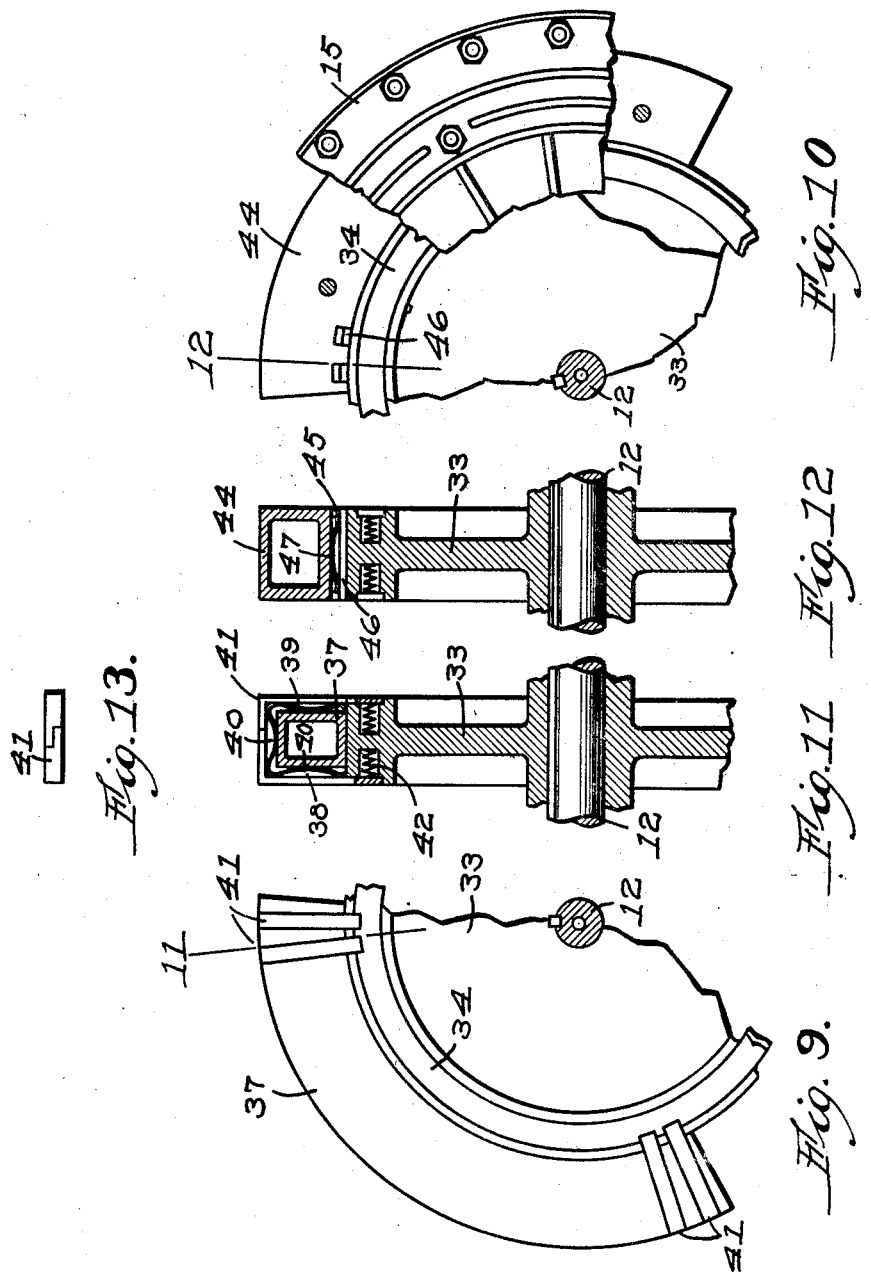

Patented July 6, 1926.

1,591,467

UNITED STATES PATENT OFFICE.

JOHN F. CARLSON, OF SOUTH BOSTON, MASSACHUSETTS.

ROTARY TWO-CYCLE INTERNAL-COMBUSTION ENGINE.

Application filed January 23, 1924. Serial No. 688,070.

This invention relates to an internal combustion engine of the above indicated character. One of the objects of the invention is to provide an air cooled gas engine which will have all the advantages of rotation over reciprocation, while at the same time having all the advantages of the two-cycle internal combustion engine and will have its parts concentrically mounted so that it does not get out of balance.

Further objects of the invention are to provide a rotary engine of this type which will have only a single inlet and outlet, a single valve, and a single spark plug for the two cylinders; to provide for admitting the fuel mixture from the forward cylinder into the back one through a by-pass which moves automatically to come into proper registration at the desired time; to provide an arrangement of cams, or a single cam as may be desired, for controlling the relative rotation of the parts that correspond with the pistons and cylinders of an ordinary engine; to provide means for rotating these two parts around the common center in a manner which in a sense is intermittent, that is, at times one part rotates faster than the other and at other times slower; and to provide positive means for preventing one of the rotary parts from rotating at the moment of explosion. The invention also involves an improvement in the packing arrangement whereby the rotary action can be provided without excessive leakage.

Further objects and advantages of the invention will be described hereinafter.

Reference is to be had to the accompanying drawings in which—

Fig. 1 is a plan of a complete engine constructed in accordance with this invention;

Fig. 2 is a vertical longitudinal sectional view through the axis of the driving shaft;

Fig. 3 is a transverse sectional view on the line 3—3 of Fig. 2 showing the cylinder in side elevation;

Figs. 4 and 5 are sectional views on the line 4—5 of Fig. 2 showing the relation of the piston and cylinder at two different points in the cycle of operation;

Figs. 6 and 7 are side views of the cam showing the position of the cam when the cylinder and piston are in positions shown in Figures 4 and 5 respectively;

Fig. 8 is a side view of the ratchet mechanism for preventing reversal partly in section;

Figs. 9 and 10 are fragmentary views of the inside of the engine showing the packing arrangements;

Figure 4:
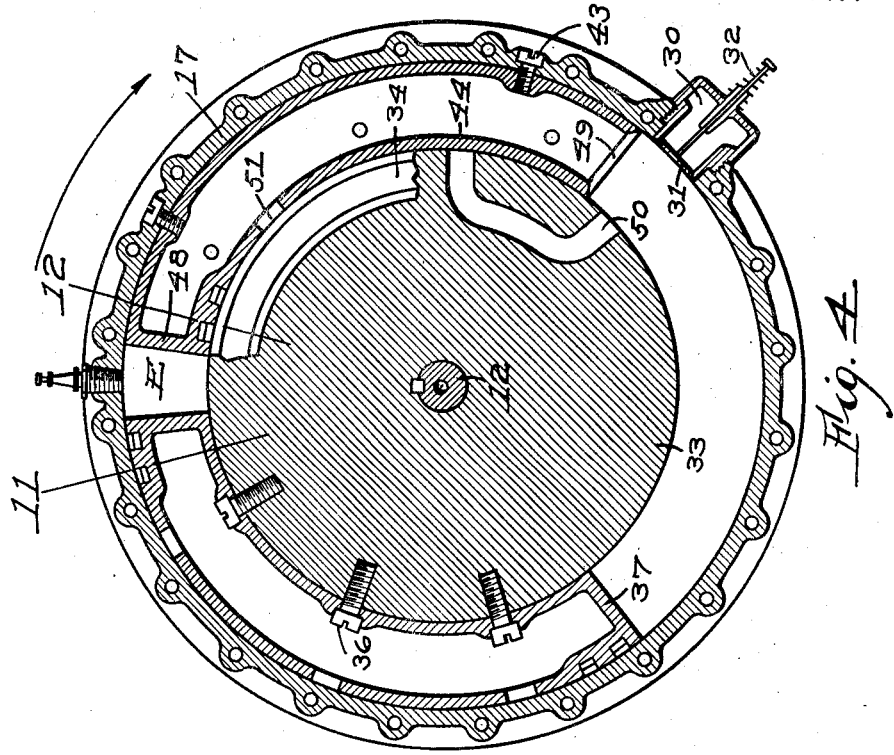

Figs. 11 and 12 are sectional views of the same on the radial lines 11 of Figs. 4 and 9 and 12 of Figs. 4 and 10 respectively; and Fig. 13 is an end view of one of the packing elements.

I have shown the invention as embodied in a construction comprising a main frame 10 having a set of bearings with their centers in a straight line through the center of the frame for supporting a driving shaft 11 and a control shaft 12 in alignment with each other. This driving shaft is keyed in a thimble 13 which is bolted to two cylindrical projections 14 each on a rotary end plate 15 which constitutes the exterior casing of the engine. This casing 15 is provided with air cooling spaced surfaces 16 and is made up of two similar parts spaced from each other by a cylindrical external wall 17 to which the two circular disc-like flat walls 15 are bolted so that the latter will be a constant distance apart. It may be stated at this point that a single spark plug 18 is used supplied with current in any desired way, the electrical connections being mounted on a bracket 19 secured in stationary position on the bearing 20 in which the cylindrical projection 14 rotates. The timer and other elements for securing the spark at the right time are not shown as they constitute no part of this invention.

The part of the casing 15 which extends away from the bearing 20 on the opposite side of the device, is also provided with a substantially cylindrical projection 21 having a depressed portion in which is keyed a gas conducting annular conduit 22 so that it rotates with the casing 15. This conduit has a flat annular disc 23 constituting a part of it and provided with packing grooves 24 on its flat surface. This annular disc enters an annular groove in a flat flange 25 on a second gas-conducting conduit 26. This latter conduit is stationary and the conduit 22 rotates within it so to speak. They both have registering annular telescoping grooves from which gas can be conducted from one to the other. The conduit 26 is provided with a gas and air or other fuel mixture inlet 27, which, although not shown connected up in this drawing, is of course provided with any usual means for conducting the gas and air previously mixed. The gas conducting channel in the conduit 26 projects inside the wall of the corresponding channel in the conduit 22 and the gas entering at 27 will be discharged all the time into the conduit 22. This is connected at one point with a radial conductor 30 secured to the side of the rotary casing 15 and therefore rotating with it in the same way as the conduit 22. Therefore the gas mixture can always be conducted from the inlet 27 into this conductor 30. This conductor is provided at the end of it with an automatic valve 31 communicating with it constantly and normally held closed by a spring 32. This constitutes the only valve which this engine has. The gas and air come into the conductor 30 behind the valve 31 and when the pressure behind the valve overcomes the contrary pressure of the spring 32, it opens the valve. In other words, when the pressure in the interior of the casing is below the pressure of the fuel mixture in the conductor 30 or at least materially below it, the valve will open and allow the mixture to enter the casing.

Inside the large cylindrical space within the casing 15 there is located on the shaft 12 a disc 33. This disc extends clear across the casing and is provided with annular packing rings 34 held out against the flat surfaces of the interior of the casing 15 by springs 35 behind them. It will be obvious therefore that as far as the facts so far described are concerned, there is an annular space between the exterior of the disc 33 and the inner surface of the outside wall 17. Furthermore, the cross section of this annular space is substantially square in the form shown in the drawing. On the disc 33, fixedly secured by bolts 36, is an abutment 37. This has the same cross section as the space just described whatever that may be and is made hollow for lightness. It is also provided, as shown in Figs. 9 and 11, with radial grooves 38 around three sides of it in which are located springs 39, each spring shown as being bent outwardly at the four corners of the cross section of the abutment and bent inwardly at two intermediate points 40 extending to the bottom of the groove. These springs press outwardly at four corners against a pair of interlocking L-shaped packing pieces 41 and tend to force these packing pieces against the two opposite flat walls of the annular space and also against the cylindrical outer wall. These packing pieces are shown as arranged in pairs at the two ends of the abutment. The packing rings are located at the ends to prevent gas escaping along the abutment from one end to the other.

Secured to the casing 15, or more specifically to the outer wall 17 thereof, by means of bolts 43 is a piston 44 having very largely the characteristics of the abutment 37. It is to be observed, however, that the abutment is secured to the disc at its inner circumference while the piston is secured to the cylinder or casing on its outer circumference. Therefore while the abutment needs packing on its outer circumference, the piston needs packing on its inner circumference which engages the disc 33 and relatively oscillates thereon. For this purpose I have shown in Figs. 10 and 12 a pair of longitudinal grooves 45 provided in the inner circumference of the piston 44 near one end. In these grooves are arranged packing pieces 46 and springs 47 behind them for forcing the springs inwardly against the surface of the disc 33. This piston is hollow also and it differs from the abutment 37 in that this abutment is closed at both ends while the piston is closed only at its rear end by a wall 48. Its front end 49 is left wide open.

I have shown a by-pass 50 in the disc 33 for conducting gas from a position in front of the piston to a position behind it, and the wall of the piston 44 is provided with a perforation 51 adapted to register with this by-pass when the parts come in the position shown in Fig. 5, the purpose of which will appear hereinafter. An exhaust opening 52 is provided at a certain point through one of the walls 15. This constitutes the entire construction of the parts that correspond with the ordinary pistons and cylinder.

It has been stated that the casing 15 rotates and it is secured to the driving shaft 11 so that it is the rotation of this casing that is utilized to drive this driving shaft. It is called a driving shaft, although driven by this machine, because it drives any mechanism that is to be connected with it. The disc 33 is also rotary as will appear.

The shaft 12 extends in through the cylindrical projection 21 and through the center of the disc 33 and beyond it into the projection 14. The disc 33 is provided with a long hub 55 extending from it in both directions and having bearings on the inner surfaces of the projections 14 and 21.

Figure 6:
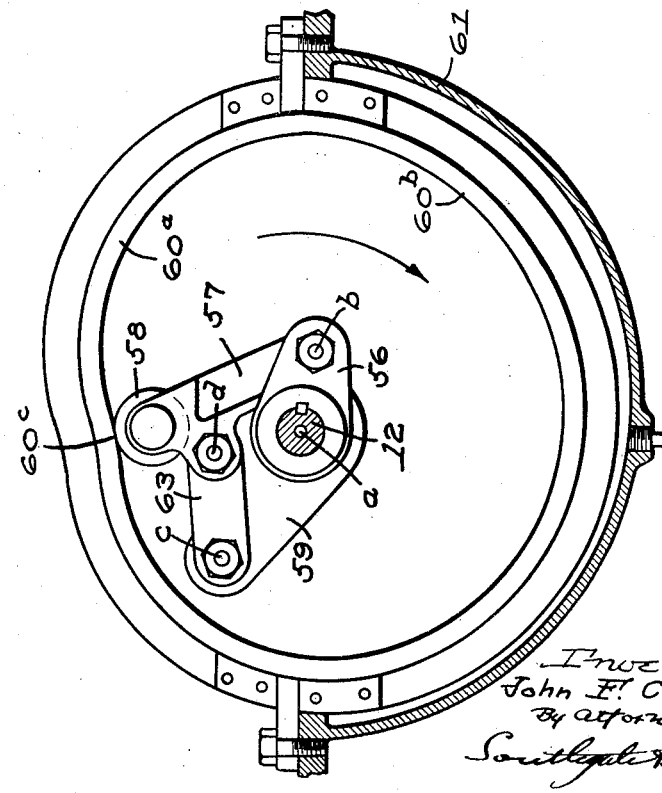

On the shaft 12 to rotate about its center is keyed an arm 56 projecting radially. Freely pivoted to this arm by a pin or stud $b$ is a roller link 57 which is provided with a cam roller 58 freely mounted thereon at its outer end. This cam roller engages an inside cam 60 which is mounted inside a casing 61 which is a stationary part of this machine. It may be said here that this casing 61 has a hub 62 preferably integral with it and constituting a bearing for the end of the projection 21 of the casing. On the end of this projection 21 and therefore rotating exactly with the casing is a crank arm 59. This is connected by a pivot pin $c$ with a link 63. To this link is pivoted by a pin $d$ a link 57. It is to be noted that the two arms 56 and 59 are rotatably mounted on the same axis but rotatable by different means so that they can be rotated at different speeds. This cam 60 is of such a nature as to move the roller 58 inwardly once during a complete revolution when in the position shown in Fig. 6. This movement of the roller inwardly changes the shape of the quadrilateral figure a b c d formed by the two arms 56 and 59 and the two links 57 and 63, and modifies this four sided figure so as to change the relative speed of rotation of the disc and casing. Of course the rest of the cam surface is so designed as to control that relationship in the way that is desired as will appear. In the drawings shown herein, centrifugal force is depended upon to force the roller 58 outwardly and keep it always in contact with the inner surface of the cam 60, but if necessary spring means can be applied for that purpose.

In order to prevent the shaft 12 from turning backwardly, I have provided ratchet means shown in Figs. 2 and 8 comprising a ratchet disc 66 keyed on the shaft 12 and shown as having two ratchet teeth 67 although any convenient number can be used. A couple of ratchet pawls 68 are pivoted on studs 69 mounted on the stationary casing 61. The studs are provided with coil springs 70 for holding the pawls against the face of the ratchet disc and preventing rotation backwardly.

The whole engine can be lubricated by introducing a lubricant into a central oil passage 73 in the shaft 12, the plug 74 being removed for that purpose. Oil passages 75 are shown for distributing the lubricant to various surfaces.

*Operation.*

Assuming that the engine is started by a self-starter, by cranking, or in any other way, Fig. 4 shows the position of the parts at the moment of explosion. Both parts have been rotating in the direction of the arrow up to this point but when the explosion takes place with the parts in the position shown in that figure, the roll 58 is pushed inwardly by encountering an inward projection 60ᶜ on the cam, and then as it continues to move around the orbit of the cam, which orbit throughout about a quarter circle in the region 60ᵃ is concentric with the stud b connecting the parts 56 and 57. Therefore the rotation can take place throughout a quarter circle without moving the arm 56 and therefore the disc 33 and the abutment 37 as there is no force to move the abutment backwardly but the force of the explosion. This is prevented at this time by the ratchet mechanism one tooth of which receives the pawl behind just at this instant. They remain stationary in the position in which the abutment is directly over and conceals the exhaust port 52 but the piston 44 is free to rotate and does rotate by the entire force of the explosion throughout this quarter circle from the position shown in Fig. 4 to that shown in Fig. 5. The abutment 37 has covered the inside port 52 all this time but just before the parts get to the position shown in Fig. 5 the inside port comes out from under the abutment, rotating of course as a part of the casing. This allows the spent gases to exhaust into the air.

As will appear later, the movement of the parts to the position shown in Fig. 4 involves the rotation of the disc 33 and the abutment 37 in the direction of the arrow and reduces the pressure in the space registering with the inlet valve 31. Therefore this valve opens and the fuel mixture is admitted to this space. Now when the piston gets to the position shown in Fig. 5 after the explosion, the explosive mixture in front of it and within it has been partly compressed as will be apparent. Now the by-pass 50 is opened by coming into registration with the port 51 and the compressed gases are forced into the space behind the piston. Just before it gets to the position shown in this figure, the roll 58 encounters a surface 60ᵇ of the cam which is not concentric with the stud b on which the arm 57 is pivoted and moves inwardly toward the center slightly. Thereafter the arm 56 and the shaft 12 are swung forward a little and the abutment 37 is moved forward from the position shown in Fig. 4. Therefore the port 52 is covered up just before the gases are admitted through the by-pass 50. Now the roller 58 works along the arc 60ᵇ which continuously forces the two pivot points b and c apart In other words, the disc 33 moves in the casing 15 during this period and rotates faster, further compressing the charge in the chamber designated E until the parts come up to that position. The final compression occurs when the roller 58 is on the point of the projection 60ᶜ of the cam. In other words, the relation between the two rotary parts is controlled by the distance apart by the two pivots b and c which is controlled by the shape of the cam. It is to be remembered that these parts never rotate backwardly, also the outer casing is never stationary. It always rotates at constant speed. The disc 33 and abutment 37 rotate only in one direction but intermittently, being entirely stopped during about a quarter of a revolution during explosion. The rest of the time they rotate faster than the casing and gradually catch up with it and overtake it.

In this way, a rotary engine is provided of the internal combustion type in which the relationship of the rotation of the two rotating parts is controlled by very simple mechanism. It is not likely to get out of order or to be subjected to any great wear. Only one spark plug, valve, inlet and outlet are required.

I am aware of the fact that the same results may be secured by two cams and two sets of rollers and levers, one to take each part of the stroke, but I prefer a single one as shown.

Although I have illustrated and described only a single form of the invention I am aware of the fact that modifications can be made therein by any person skilled in the art without departing from the scope of the invention as expressed in the claims. Therefore I do not wish to be limited to all the details of construction herein shown and described, but what I do claim is:—

1. In a two cycle internal combustion rotary engine, the combination with a casing having a power driven shaft connected thereto and adapted to rotate to deliver power, provided with a single automatically operating inlet valve, a single exhaust port opening into the air and a single spark plug, and a piston secured to the inner wall thereof, of a circular disc rotatable in the casing and provided with an abutment secured to the circumference thereof, the piston and the abutment fitting the space between the disc and the casing, said engine having a by-pass for conducting an explosive mixture from the front of the piston to the rear of it, and means for controlling the relative speeds of rotation of the casing and disc for spacing the abutment and piston to provide for admission, compression, explosion and exhaust.

2. In a two cycle internal combustion rotary engine, the combination with a round casing having a power driven shaft concentrically connected thereto and adapted to rotate constantly in one direction to deliver power, provided with a single automatically operating inlet valve, a single exhaust port opening into the air and a single spark plug, and a hollow arcuate piston secured to the inner wall thereof closed at one end and open at the other, of a circular disc independently rotatable in the casing and concentric therewith and provided with an arcuate abutment secured to the circumference thereof, the piston and the abutment fitting the space between the disc and the casing, said disc having a by-pass therethrough for conducting an explosive mixture from the interior of said piston to a position beyond its end, and means for controlling the speed of rotation of the disc relative to the casing to provide for admission, compression, explosion and exhaust.

3. In a two cycle internal combustion rotary engine, the combination of a casing for receiving an explosive mixture, a piston mounted inside said casing and fixed thereto, said piston being hollow and being open at its forward end and closed at its read end, a disc located in said casing, an abutment fixed to said disc, said abutment and piston each fitting the space between the disc and casing, means for rotating the disc from the casing and varying that rotation for the purpose of securing admission, compression, and exhaust, an admission valve and a spark plug movable with the casing, and means whereby an explosive charge introduced into the casing in front of the piston will be transferred from the inside of the piston to a space in the casing behind the piston and thereafter compressed between the forward end of the abutment and the solid rear end of the piston.

4. In a two cycle internal combustion rotary engine, the combination with a casing having a power driven shaft connected thereto and adapted to rotate to deliver power, provided with a single spark plug, and a piston secured thereto, of a circular disc rotatable in the casing and provided with an abutment, the piston and the abutment fitting the space between the disc and the casing, said engine having a by-pass for conducting an explosive mixture from the front of the piston to the rear of it, means for exploding a charge once during a complete rotation, and means for controlling the relative speeds of rotation of the casing and disc by spacing the abutment and piston to provide for admission, compression, explosion and exhaust.

5. In an internal combustion rotary engine, the combination of a rotary casing having a space therein for an explosive mixture, a disc within said casing, a piston fixed to the casing, an abutment fixed to the disc both located in the space between the disc and casing, said piston being hollow and having a solid rear end and an open front end for the reception of an explosive mixture when it is introduced into the space between the casing and disc.

6. In an internal combustion rotary engine, the combination of a rotary casing having a space therein for an explosive mixture, a concentric disc within said casing, a piston fixed to the casing, an abutment fixed to the disc filling a part of the space between the disc and casing and of the same cross section as the cross section of said space, said piston being hollow and having a solid rear end and an open front end for the reception of an explosive mixture when it is introduced into the space between the casing and disc, the inner wall of said piston having a port and the disc having a by-pass adapted to register with the said port at a point in the rotation of the parts, said by-pass being adapted to deliver gases from the interior of the piston, when the by-pass registers with the port, to a point beyond the closed end of the piston, whereby the gases will be forced into the space behind the piston and be compressed by the advancing abutment.

7. In an internal combustion rotary engine, the combination of a rotary casing having a space for receiving an explosive mixture, a disc within said casing, a hollow piston fixed to the casing, an abutment fixed to the disc of the same cross section as the cross section of the space between the disc and casing, said piston having a port and said disc having a by-pass adapted to register with the said port at a point in the rotation of the parts, said by-pass being located to deliver gases from the interior of the piston when the by-pass registers with the port to a point beyond the rear end of the piston, whereby the gases will be forced into the space behind the piston and be compressed by the advancing abutment.

8. In an internal combustion engine, the combination of a driving shaft and a control shaft, with a casing fixed to the driving shaft to rotate it constantly, a disc within said casing fixed to and rotatable by the control shaft, a stationary fuel inlet connected with an annular conduit fixed with respect to said casing and having a complete circular recess registering constantly with the interior of said inlet and rotatable with respect thereto, a conductor extending from a point in said conduit to a point on said casing at which a port is located for the admission of the explosive mixture to the casing, a valve for controlling said port, and means whereby the valve is operated to permit the mixture to come through it into the casing once during each revolution of the casing.

9. In an internal combustion engine, the combination of a driving shaft and a control shaft in alignment, with a circular casing fixed to the driving shaft to rotate it constantly, a circular disc within said casing fixed to the control shaft to rotate with the control shaft, a stationary casing surrounding said control shaft, a stationary fuel inlet connected with said casing, an annular conduit fixed with respect to the first named casing and having a complete circular recess registering constantly with the interior of said inlet and rotatable with respect thereto, packing rings located between the rotary conduit and stationary inlet, a radial conductor extending from a point in said conduit to a point on the circumference of said casing at which a port is located for the admission of the explosive mixture to the casing, a valve for controlling said port, and a spring for normally holding said valve closed but adapted to yield under a reduction of pressure inside the casing to permit the mixture to come through it.

10. In an internal combustion rotary engine, the combination with a casing for receiving the explosive mixture and transmitting power, a control shaft concentric with said casing and extending into it, and a disc fixed on the control shaft located in said casing, said casing having a projecting portion provided with an arm extending radially from the center thereof, the control shaft having an arm extending therefrom, of means for connecting said arms together so that they are capable of shifting circumferentially with respect to each other, means for controlling the relative location of said arms during each cycle of operations, a stationary casing surrounding said control shaft, a ratchet pawl pivoted on the stationary casing, and a ratchet wheel fixed on the control shaft for engagement with said pawl to prevent rotation of the control shaft reversely.

11. In an internal combustion rotary engine, the combination with a casing for receiving the explosive mixture and transmitting power, a control shaft, a disc fixed on the control shaft and located in said casing, said casing having a projecting portion provided with an arm extending therefrom, the control shaft having an arm extending therefrom, means for connecting said arms together so that they are capable of shifting circumferentially with respect to each other, means for controlling the relative location of said arms during each cycle of operations, a ratchet pawl pivoted on a stationary pivot, and a ratchet wheel fixed on the control shaft for engagement with said pawl to prevent rotation of the control shaft reversely.

12. In a rotary internal combustion engine, the combination of a rotary casing for receiving the explosive mixture and transmitting power, a disc located in said casing, a control shaft on which the disc is fixed, an arm on said casing, an arm on said control shaft, a pair of links pivoted to the ends of said arms and pivoted to each other, and means located in fixed position and adapted to be engaged by one of said links for controlling the shape of the figure formed by the center of the control shaft and the three pivotal points of the links, whereby the control shaft will be rocked relatively to the casing during each rotation of the casing.

13. In a rotary internal combustion engine, the combination of a rotary casing for receiving the explosive mixture and transmitting power, a disc located in said casing and concentric therewith, a control shaft on which the disc is fixed, the casing having a cylindrical projection at one end, a radial arm on said projection, a radial arm on said control shaft, a pair of links pivoted to the ends of said radial arms and pivoted to each other, and a cam located in fixed position and adapted to be engaged by one of said links to control the shape of the figure formed by the center of the control shaft and the three pivotal points of the links, whereby the control shaft will be rocked relatively to the casing by the action of said cam.

14. In a rotary internal combustion engine, the combination of a casing for receiving the explosive mixture and transmitting the power, a rotary disc located therein, a piston carried by said casing, an abutment on the disc, the piston and abutment extending across the space between the disc and casing and providing a fuel compression space between them, a control shaft on which the disc is fixed, an arm projecting from the control shaft, a projection on the casing at one end having an arm projecting therefrom, two links pivotally connected to the ends of said arms and to each other, a roller carried by one of said links, and a cam in position for engagement with said roller for controlling the distance of the roller from the center of the control shaft, whereby when the roller is forced inwardly the two arms will be forced apart and the disc will rotate faster than the casing.

15. In a rotary internal combustion engine, the combination of a circular casing for receiving the explosive mixture and transmitting the power, a rotary disc located therein and extending across the casing, a piston carried by said casing, an abutment carried by the disc, a control shaft on which the disc is fixed located concentrically with respect to the disc and casing, an arm projecting radially from the control shaft, a projection on the casing at one end having an arm projecting radially therefrom, two links pivoted to the ends of said arms and pivoted to each other, a roller carried by one end of one of said links, and a stationary internal cam in position for engagement with said roller for controlling the distance of the roller from the center of the control shaft, whereby when the roller is forced inwardly the two arms will be forced apart and the disc will rotate faster than the casing.

16. In a rotary internal combustion engine, the combination of a casing for receiving the explosive mixture and transmitting the power, a rotary disc located therein, a piston carried by said casing, an abutment carried by the disc and extending across the space between the disc and casing, a control shaft on which the disc is fixed located concentrically with respect to the disc and casing, an arm projecting from the control shaft, a projection on the casing at one end having an arm projecting therefrom, two links pivotally connected to the ends of said arms and to each other, a roller carried by one of said links, and a stationary cam in position for engagement with said roller for controlling the distance of the roller from the center of the control shaft, said cam having most of its circumference so shaped as to cause the disc to rotate faster than the casing and provided with an inwardly extending projection for causing the disc to rotate rapidly toward the end of the compression stroke to complete the compression and provided with a portion concentric with the control shaft just beyond said inward projection to hold the disc stationary throughout a portion of a revolution to keep the abutment stationary while the explosion is taking place and force the piston and the casing forward.

17. In a rotary internal combustion engine, the combination of a circular casing for receiving the explosive mixture and transmitting the power, a rotary disc located therein, an abutment carried by said disc, a piston carried by the casing and spaced from the abutment circumferentially, the piston and abutment extending across the space between the disc and casing, a control shaft on which the disc is fixed located concentrically with respect to the disc and casing, an arm projecting radially from the control shaft, a projection on the casing at one end having an arm projecting radially therefrom, two links pivoted to the ends of said arms and pivoted to each other, a roller carried by one end of said links, and a stationary cam in position for engagement with said roller for controlling the distance of the roller from the center of the control shaft being provided with an inwardly extending projection for causing the disc to rotate rapidly toward the end of the compression stroke to complete the compression and provided with a portion concentric with the control shaft just beyond said inward projection to hold the disc stationary throughout a portion of a revolution to keep the abutment stationary while the explosion is taking place and force the piston and the casing forward.

18. In a rotary internal combustion engine, the combination of a circular casing for receiving the explosive mixture and transmitting the power, a rotary disc located therein, an abutment carried by said disc, a piston carried by the casing and space from the abutment circumferentially, the piston and abutment extending across the space between the disc and casing, a control shaft on which the disc is fixed located concentrically with respect to the disc and casing, an arm projecting from the control shaft, a projection on the casing at one end having an arm projecting therefrom, two links pivoted to the ends of said arms and pivoted to each other, and a cam in position for engagement with one of said links for controlling the operation thereof being provided with an inwardly extending projection for causing the disc to rotate rapidly toward the end of the compression stroke to complete the compression and provided with a portion concentric with the control shaft just beyond said inward projection to hold the disc stationary throughout a portion of a revolution to keep the abutment stationary while the explosion is taking place and force the piston and the casing forward.

19. In a rotary internal combustion engine, the combination of a rotary casing for receiving the explosive mixture and transmitting power, a disc located in said casing, a control shaft on which the disc is fixed, an arm on said casing, a control shaft on which the disc is fixed, an arm on said casing, an arm on said control shaft, a pair of links pivoted to the ends of said arms and pivoted to each other to form a quadrilateral figure, and means for controlling the shape of the figure to rock the control shaft relatively to the casing during each rotation of the casing.

In testimony whereof I have hereunto affixed my signature.

JOHN F. CARLSON.